US012340149B2

(12) United States Patent
Yamada

(10) Patent No.: US 12,340,149 B2
(45) Date of Patent: Jun. 24, 2025

(54) CHARACTER INPUT DEVICE, CHARACTER INPUT METHOD, AND CHARACTER INPUT COMPUTER-READABLE RECORDING MEDIUM

(71) Applicant: OMRON Corporation, Kyoto (JP)

(72) Inventor: Takahiro Yamada, Muko (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 18/302,789

(22) Filed: Apr. 19, 2023

(65) Prior Publication Data

US 2023/0376270 A1 Nov. 23, 2023

(30) Foreign Application Priority Data

May 19, 2022 (JP) .................. 2022-082011

(51) Int. Cl.
*G06F 3/16* (2006.01)
*G06F 3/04886* (2022.01)

(52) U.S. Cl.
CPC .......... *G06F 3/167* (2013.01); *G06F 3/04886* (2013.01)

(58) Field of Classification Search
CPC ..... G06F 3/167; G06F 3/04886; G06F 3/0237
See application file for complete search history.

(56) References Cited

U.S. PATENT DOCUMENTS 8,705,527 B1 * 4/2014 Addepalli ............... H04L 1/008
370/389
2008/0300886 A1 12/2008 Patch
2010/0131476 A1 * 5/2010 Kataoka ............ G06F 16/90335
707/693
2012/0265778 A1 * 10/2012 Chen .................. G06F 16/3332
707/765
2016/0313868 A1 10/2016 Weng et al.
2020/0034444 A1 * 1/2020 Zhang ................. G06F 40/284
2022/0358727 A1 * 11/2022 Gupta ................. G06T 19/006
(Continued)

FOREIGN PATENT DOCUMENTS

JP 2019087058 6/2019
JP 2021532492 11/2021

OTHER PUBLICATIONS

"Search Report of Europe Counterpart Application", issued on Oct. 17, 2023, p. 1-p. 10.

*Primary Examiner* — Angie Badawi
(74) *Attorney, Agent, or Firm* — JCIPRNET

(57) ABSTRACT

A character input device converts an input character string into a corresponding conversion character string, and includes a first input unit accepting input of a first character string by a first input method; a second input unit accepting input of a second character string by a second input method; and a character string combination unit that, when the input of the first character string is accepted after the input of the second character string, generates an input character string candidate by connecting the first and the second character string accepted for input this time. The character string combination unit extracts an identical character string as a duplicate character string at a tail of the first character string and a head of the second character string; and generates a character string formed by connecting the first and the second character string without the duplicate character string by the duplicate character string.

10 Claims, 12 Drawing Sheets

(56) References Cited

U.S. PATENT DOCUMENTS

2023/0088411 A1* 3/2023 Chiu ...................... G06F 16/35
　　　　　　　　　　　　　　　　　　　　704/9
2023/0128422 A1* 4/2023 Li .......................... G10L 15/24
　　　　　　　　　　　　　　　　　　　　345/156

* cited by examiner

CHARACTER INPUT DEVICE, CHARACTER INPUT METHOD, AND CHARACTER INPUT COMPUTER-READABLE RECORDING MEDIUM

CROSS-REFERENCE TO RELATED APPLICATION

This application claims the priority benefits of Japanese application no. 2022-082011, filed on May 19, 2022. The entirety of the above-mentioned patent application is hereby incorporated by reference herein and made a part of this specification.

BACKGROUND

Technical Field

The disclosure relates to a technique for supporting character input.

Related Art

A user searches for a travel route to a destination using a vehicle-mounted device (car navigator will be described below as an example). The car navigator is provided with a plurality of input methods for inputting a character string corresponding to a destination. This input method is keyboard input using a touch panel and input by voice recognition, for example.

For example, while the car is parked (when the running speed is 0), the user uses the touch panel of the car navigator to input a character string corresponding to the destination with a keyboard.

CITATION LIST

Patent Literature

[Patent Literature 1] JP2021-532492

Patent Literature 1 discloses a technique of a character input method including at least two input methods such as keyboard input and voice input. For example, when the user writes an e-mail, he or she inputs characters with both methods of keyboard input and voice input.

When operating the car navigator using the configuration described in Patent Literature 1, the user uses keyboard input while the car is stopped, and voice input after starting the car. As a result, the destination of the car navigator is a character string (hereinafter referred to as a combined character string) acquired by combining the character string input from the keyboard and the character string input by voice.

However, when a combined character string is directed combined from a character string input by a user using keyboard and a character string input by voice input, there may be duplicate character strings because the input methods are different. That is, the user is unable to acquire the intended search result.

At this time, the user may acquire a desired combined character string by intentionally deleting the duplicate character strings. However, such operations are troublesome and may cause inconvenience to the user.

Accordingly, it is an object of the disclosure to provide a function that enables efficient character input when a plurality of input methods are provided.

The character input device of the disclosure is configured as follows.

SUMMARY

A character input device converts an input character string into a corresponding conversion character string. The character input device includes a first input unit, a second input unit, and a character string combination unit. The first input unit accepts input of a first character string by a first input method. The second input unit accepts input of a second character string by a second input method different from the first input method. When the input of the first character string is accepted after the input of the second character string is accepted, the character string combination unit generates an input character string candidate by connecting the first character string and the second character string accepted for input this time. Further, the character string combination unit extracts an identical character string as a duplicate character string at a tail of the first character string and a head of the second character string; and when the duplicate character string is extracted, generates a character string as one of the input character string candidates formed by connecting the first character string without the duplicate character string and the second character string without the duplicate character string by the duplicate character string.

The character string combination unit of the character input device generates a character string as one of input character string candidates formed by connecting the second character string immediately after the first character string. Moreover, the character input device includes a score calculation unit that divides the conversion character string of the input character string into vocabulary units for each input character string candidate, and calculates a co-occurrence frequency between the vocabularies; and a priority determination unit that determines priority of conversion character strings according to the co-occurrence frequency calculated by the score calculation unit.

A character string combination unit of the character input device predicts a joining character string that connects the first character string and the second character string, and generates a character string as one of the input character string candidates formed by connecting the first character string and the second character string with the joining character string. Moreover, the character input device includes: a score calculation unit that divides the conversion character string of each input character string into vocabularies for each input character string candidate and calculates the co-occurrence frequency between vocabularies; and a priority determination unit that determines priority of the conversion character strings according to the co-occurrence frequency calculated by the score calculation unit.

A character string combination unit of the character input device predicts a joining character string that connects the first character string and the second character string, and generates a character string as one of the input character string candidates formed by connecting the first character string and the second character string with the joining character string.

One of the first input method and the second input method of the character input device is a key input method, and the other is a voice input method.

According to a character input method of the disclosure, a computer of a character input device that converts an input character string into a corresponding conversion character string performs: a first step of accepting input of a first character string by a first input method; a second step of accepting input of a second character string by a second input method different from the first input method; and a third step of generating, when the input of the second character string is accepted after the input of the first character string is accepted, an input character string candidate by connecting the first character string and the second character string accepted for input this time. The third step: extracts an identical character string as a duplicate character string at a tail of the first character string and a head of the second character string; and when the duplicate character string is extracted, generates a character string as one of the input character string candidates formed by connecting the first character string without the duplicate character string and the second character string without the duplicate character string by the duplicate character string.

According to a character input computer-readable recording medium of the disclosure causes a computer of a character input device that converts an input character string into a corresponding conversion character string to perform: a first step of accepting input of a first character string by a first input method; a second step of accepting input of a second character string by a second input method different from the first input method; and a third step of generating, when the input of the second character string is accepted after the first character string is accepted, an input character string candidate formed by connecting the first character string and the second character string accepted for input this time. The third step: extracts an identical character string as a duplicate character string at a tail of the first character string and a head of the second character string; and when the duplicate character string is extracted, generates a character string as one of the input character string candidates formed by connecting the first character string without the duplicate character string and the second character string without the duplicate character string by the duplicate character string.

DESCRIPTION OF THE ROADS

With such configuration, even if a duplicate character string exists in the combined character strings, the procedure for deleting the duplicate character string may be omitted. That is, the efficiency of user's character input can be improved.

According to the disclosure, it is possible to provide a function that enables efficient character input when a plurality of input methods are provided.

Embodiments for implementing the disclosure will be described below with reference to several drawings.

1. Application Example

Figure 1:
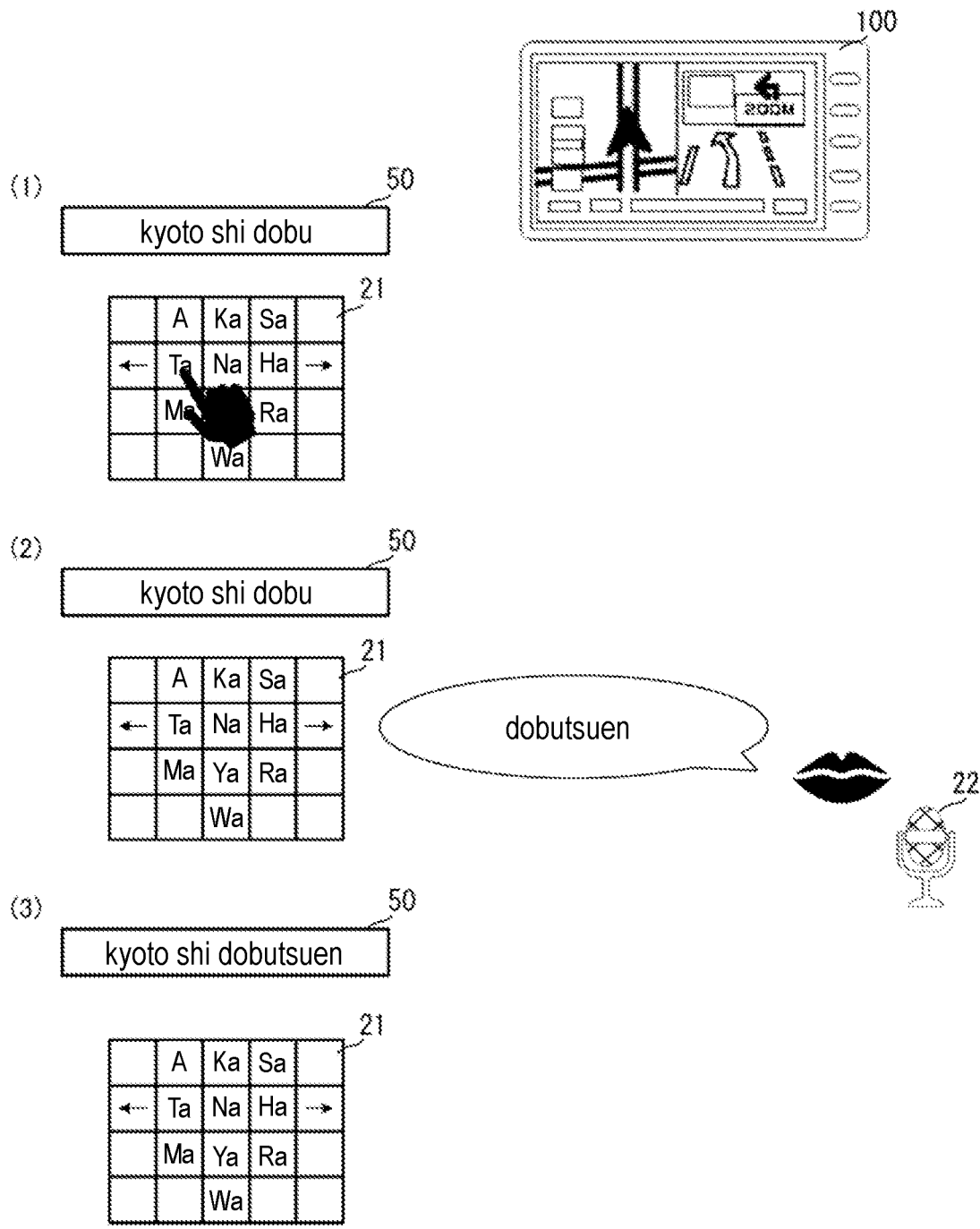
FIG. 1 is an image diagram of character input by a character input device according to an Application Example.

FIG. 1 is an image diagram of character input by a character input device 10. The character input device 10 is mounted, for example, on a vehicle-mounted device. The vehicle-mounted device is a car navigator that searches for a travel route to a destination by inputting the destination. This vehicle-mounted device includes the character input device 10 for inputting a destination. The character input device 10 is provided with a plurality of input methods.

As described above, the character input device 10 is mounted in an electronic device such as a car navigator. The electronic device is not limited to car navigator, and may be any device such as a tablet or a personal computer that allows character input.

A specific example in which the user inputs characters will be described. A car navigator 100 includes a touch panel. A user activates an application (hereinafter referred to as an application) installed in the car navigator 100 using the touch panel.

The user activates a destination search application, for example. The user inputs a character string to an input display unit 50. In this example, a destination search application will be used for explanation, but the type of application is not limited as long as it has a function of inputting characters.

Here, the character input methods in the character input device 10 will be described. The character input device 10 includes a first input unit 21 and a second input unit 22. In the disclosure, the first input unit 21 is for keyboard input, and the second input unit 22 is for voice input. The first input unit 21 accepts input only while the car is stopped. On the other hand, the second input unit 22 accepts inputs regardless of whether the car is stopped or running.

A more specific example will be described using an example in which the user sets a character string "kyoto shi dobutsuen" (Kyoto city zoo) as a destination. The user first performs keyboard input using the first input unit 21 and then performs voice input using the second input unit 22. Details will be described below using the configuration of FIG. 1.

(1) Character Input Using the First Input Unit 21

The user operates a car navigator while the car is stopped (for example, while the car is waiting for signals). The user uses the first input unit 21 to input a first character string "kyoto shi dobu" (Kyoto city z).

At this time, the user confirms that the signal has turned green, and starts the car. As a result, the first input unit 21 stops accepting character input.

(2) Character Input Using the Second Input Unit 22

The user confirms that the first input unit 21 does not accept character input, and starts input using the second input unit 22. The user uses the second input unit 22 to input a second character string "dobutsuen" (zoo). The user ends the input of the character string for searching by pressing a button for performing search, for example.

(3) Generation of Combined Character String

The character input device 10 combines the first character string "kyoto shi dobu" and the second character string "dobutsuen" to generate a third character string "kyoto shi dobu dobutsuen" (Kyoto city z zoo). At this time, the character input device 10 determines whether or not there is a duplicate character string in the third character string (hereinafter referred to as a duplicate character string).

The character input device 10 determines that the duplicate character string "dobu" exists, and deletes the duplicate character string "dobu". More specifically, the character input device 10 determines that "dobu", which is the character string on the tail of the first character string "kyoto shi dobu", and the character string "dobu" at the head of the second character string "dobutsu" are duplicate character strings.

The character input device 10 deletes the duplicate character string "dobu" from the first character string "kyoto shi dobu" and generates "kyoto shi" as a part of the first character string. Further, the character input device 10 deletes the duplicate character string "dobu" from the second character string "dobutsuen" and generates "tsuen" as a part of the second character string.

Next, the character input device 10 joins the part of the first character string "kyoto shi", the duplicate character string "dobu", and the part of the second character string, and generates a fourth character string "kyoto shi dobutsuen" (Kyoto city zoo) from "kyoto shi", "dobu", and "tsuen". This fourth character string corresponds to the "input character string" of the disclosure.

The character input device 10 acquires a conversion candidate "Kyoto city zoo" of the fourth character string "kyoto shi dobutsuen" from a dictionary database (hereinafter referred to as "dictionary DB"). The character input device 10 outputs the character string "Kyoto city zoo" to the car navigator. The car navigator displays location information that matches the character string "Kyoto city zoo".

By providing such a configuration, it is possible to acquire an intended character string even when the user performs operations by combining a plurality of input methods. Further, when a duplicate character string exists in the first character string and the second character string, it is possible to delete the duplicate character string by determining that the duplicate character string exists.

That is, it is possible to easily acquire the character string intended by the user, and the user can efficiently input characters.

2. Configuration Example 1

Figure 2:
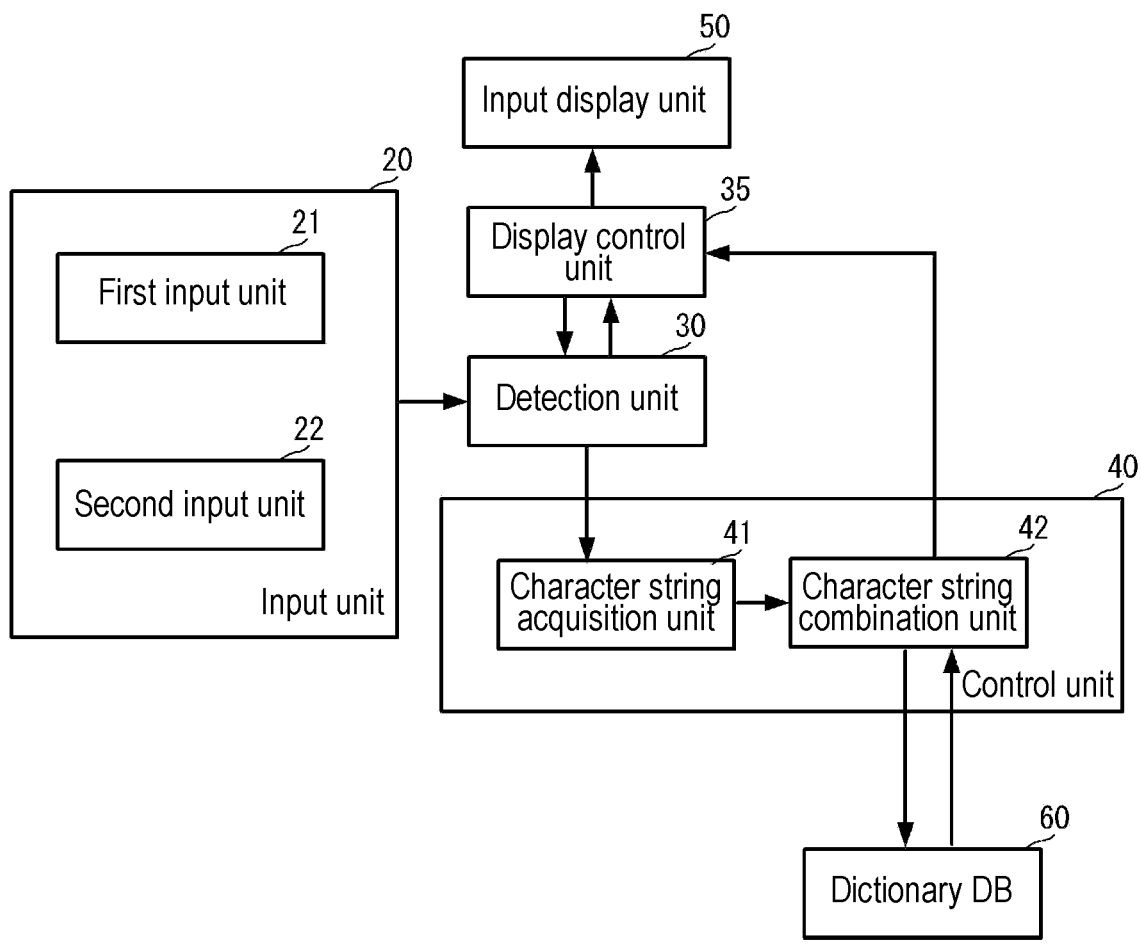
FIG. 2 is a block diagram illustrating the configuration of a character input device according to Configuration Example 1.
Figure 3:
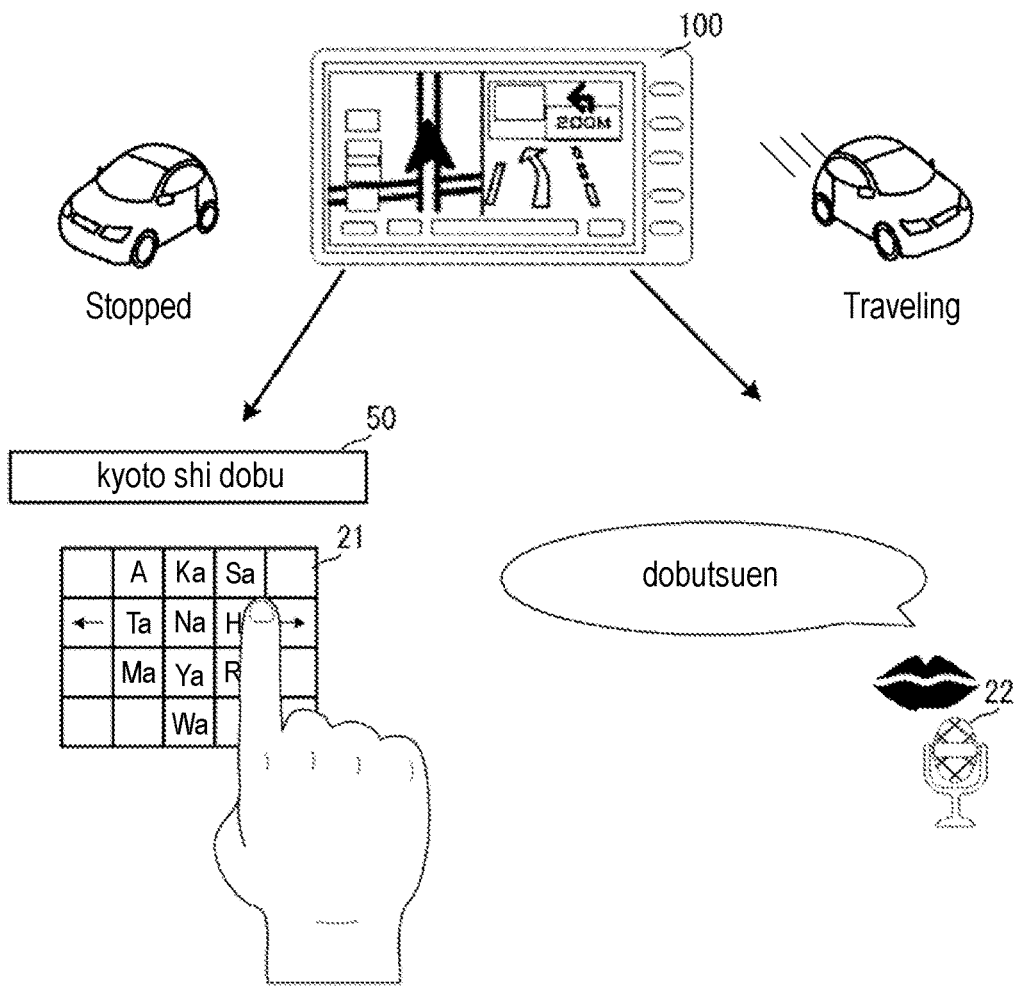
FIG. 3 is an image diagram of character input by a character input device according to Configuration Example 1.

FIG. 2 is a block diagram illustrating the configuration of a character input device according to Configuration Example 1. FIG. 3 is an image diagram of character input by a character input device according to Configuration Example 1. As described above, the example to which the character input device 10 is applied is not limited to car navigator, and may be other electronic devices capable of inputting characters.

As shown in FIG. 2, the character input device 10 includes an input unit 20, a detection unit 30, a display control unit 35, a control unit 40, the input display unit 50, and a dictionary DB 60.

As described above, the input unit 20 includes the first input unit 21 and the second input unit 22. For example, as shown in FIG. 1, the first input unit 21 and the second input unit 22 are activated by operating the car navigator 100.

The character input device 10 includes a touch panel. This touch panel detects a user's operation. Detection of operation includes, for example, those of an operation position, a length of time during which the operation is performed, a temporal change in the operation position, and the like. Detection results of these operations are output to the detection unit 30. The detection unit 30 outputs the result to the display control unit 35 and the control unit 40 according to the result input from the touch panel. The display control unit 35 outputs to the input display unit 50 so as to display according to the operation result.

The first input unit 21 accepts key inputs from, for example, a software keyboard. Various keys for character input are displayed on the first input unit 21. The user inputs the first character string by the first input method (key input method) using the first input unit 21.

The second input unit 22 accepts voice input from a microphone, for example. The second input unit 22 outputs voice information (second character string) uttered by the user to a voice recognition unit (not shown). The voice recognition unit acquires feature quantities from the waveform of the voice information and quantifies the feature quantities. Further, the voice recognition unit performs algorithm analysis on the quantified information and outputs it to the display control unit 35 as a character string. The display control unit 35 causes the input display unit 50 to display the second character string. That is, the user inputs the second character string by the second input method (voice input method) using the second input unit 22.

The control unit 40 includes a character string acquisition unit 41 and a character string combination unit 42. The control unit 40 is configured by a hardware CPU, memory, and other electronic circuits. When the hardware CPU executes the character input program according to the disclosure, it operates as the character string acquisition unit 41 and the character string combination unit 42. Moreover, the memory has a region for developing the character input program according to the disclosure and a region for temporarily storing data generated when the character input program is executed. The control unit 40 may be an LSI that integrates a hardware CPU, memory, and the like. Moreover, the hardware CPU is a computer that performs the character input method according to the disclosure.

The character string acquisition unit 41 acquires the first character string by the first input method using the first input unit 21 and acquires the second character string by the second input method using the second input unit 22. The character string acquisition unit 41 outputs the first character string and the second character string to the character string combination unit 42.

The character string combination unit 42 combines the first character string and the second character string. Detailed procedures will be described later. The character string combination unit 42 outputs a character string acquired by combining the first character string and the second character string to the display control unit 35. The display control unit 35 causes the input display unit 50 to display the result.

The user uses the character string displayed on the input display unit 50 to perform a search. The character input device 10 searches a dictionary DB (dictionary database) and a map DB (map database) (not shown). Thereby, the character input device 10 displays the search result and position information.

A more specific configuration will be described with reference to FIG. 3. The user activates the destination search application of the car navigator 100. At this time, an example in which the user inputs the character string "kyoto shi dobutsuen" will be described.

While the car is stopped, the user uses the first input unit 21 to input the first character string "kyoto shi dobu" to the input display unit 50 (state (1) in FIG. 3). As described above, the first input unit 21 is a software keyboard. The user inputs the first character string "kyoto shi dobu".

The first input unit 21 outputs the first character string "kyoto shi dobu" to the detection unit 30. The first input unit 21 outputs the first character string "kyoto shi dobu" to the detection unit 30. The detection unit 30 outputs the first character string "kyoto shi dobu" to the display control unit 35 and the character string acquisition unit 41. The display control unit 35 causes the input display unit 50 to display the first character string "kyoto shi dobu".

Next, the user starts the car. As a result, the first input unit 21 stops accepting character input. The user uses the second input unit 22 to input the second character string following the first character string "kyoto shi dobu". More specifically, the user uses the second input unit 22 to input the second character string "dobutsuen".

The second input unit 22 outputs the second character string "dobutsuen" to the detection unit 30. The first input unit 21 outputs the second character string "dobutsuen" to the detection unit 30. The detection unit 30 outputs the second character string "dobutsuen" to the character string acquisition unit 41 (state (2) in FIG. 3).

The character string acquisition unit 41 outputs the first character string "kyoto shi dobu" and the second character string "dobutsuen" to the character string combination unit 42.

The character string combination unit 42 combines the first character string "kyoto shi dobu" and the second character string "dobutsuen" to create a third character string "kyoto shi dobu dobutsuen" (see state (3) in FIG. 3). At this time, the character string combination unit 42 determines the duplicate character string between the first character string "kyoto shi dobu" and the second character string "dobutsuen".

At this time, the character string combination unit 42 determines that the character string "dobu" at the tail of the first character string "kyoto shi dobu", and the character string "dobu" at the head of the second character string "dobutsuen" are duplicate character strings.

The character string combination unit 42 deletes the duplicate character string "dobu" from the first character string "kyoto shi dobu" and generates "kyoto shi" as a part of the first character string. Further, the character string combination unit 42 deletes the duplicate character string "dobu" from the second character string "dobutsuen" and generates "tsuen" as a part of the second character string.

Next, the character string combination unit 42 combines the part of the first character string "kyoto shi", the duplicate character string "dobu", and the part of the second character string "tsuen" to form a fourth character string "kyoto shi dobutsuen" (Kyoto city zoo). As a result, the character string combination unit 42 may acquire the conversion candidate "Kyoto city zoo" intended by the user from the dictionary DB 60.

That is, even when the user inputs characters by combining a plurality of input methods (the first input unit 21 and the second input unit 22), the intended character string may be acquired. Further, when a duplicate character string exists in the first character string and the second character string, it is possible to delete the duplicate character string by determining that the duplicate character string exists. Thus, it is possible to easily acquire the character string intended by the user, and the user can efficiently input characters.

3. Operation Example

Figure 4:
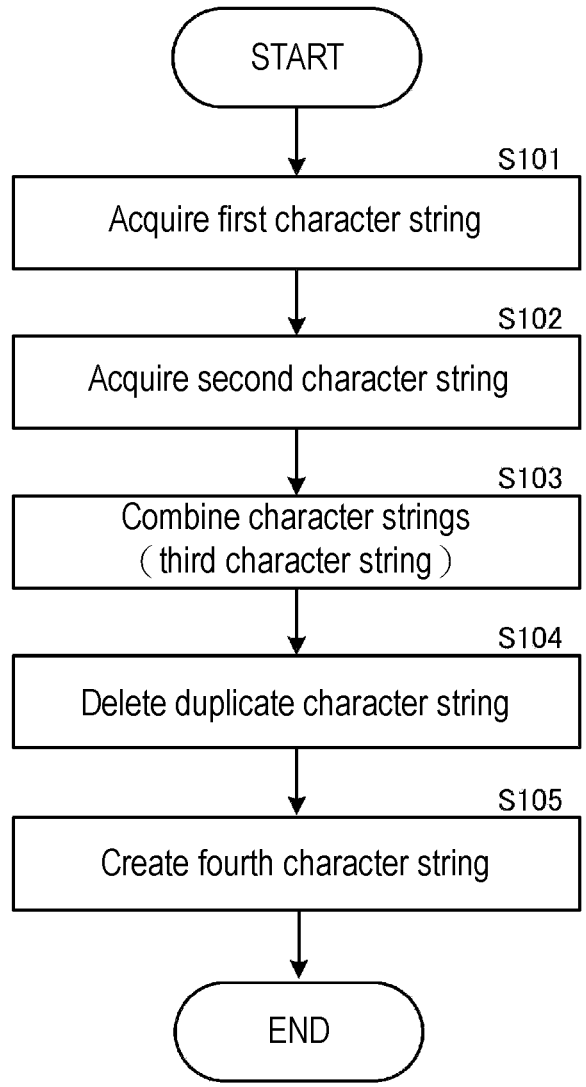
FIG. 4 is a flow chart illustrating the flow of processing of a character input device according to an Operation Example.

FIG. 4 is a flow chart illustrating the flow of processing of the character input device according to an Operation Example. The processing flow of the character input device 10 will be described with reference to FIGS. 1, 2, 3, and 4.

The first input unit 21 accepts a first character string input by the user using the first input method. The first input unit 21 outputs the first character string to the detection unit 30. The detection unit 30 outputs the first character string to the character string acquisition unit 41 (S101).

Next, the second input unit 22 accepts a second character string input by the user using the second input method. The second input unit 22 outputs the second character string to the detection unit 30. The detection unit 30 outputs the second character string to the character string acquisition unit 41 (S102).

The character string acquisition unit 41 outputs the first character string and the second character string to the character string combination unit 42. The character string combination unit 42 combines the first character string and the second character string to create a third character string (S103).

The character string combination unit 42 determines the duplicate character string from the character string on the tail of the first character string and the character string on the head of the second character string. The character string combination unit 42 deletes the duplicate character strings from the first character string and the second character string (S104).

The character string combination unit 42 creates a fourth character string from which duplicate character strings are deleted (S105).

In this way, even when the user inputs characters by combining a plurality of input methods (the first input unit 21 and the second input unit 22), the intended character string may be acquired. Further, when a duplicate character string exists in the first character string and the second character string, it is possible to delete the duplicate character string by determining that the duplicate character string exists.

That is, the user can easily acquire the intended character string without being conscious of the duplicate character strings of the character string input by the first input unit 21 and the character string input by the second input unit 22. That is, the user can efficiently input characters.

4. Modification Example 1

Next, a character input device according to Modification Example 1 will be described with reference to the drawings. In Configuration Example 1, only the process of deleting duplicate character strings is performed, whereas in Modification Example 1, the process of determining whether or not there is a duplicate character string is performed. The rest of the configuration is the same as that of the character input device 10, and the description of the similar parts is omitted.

Figure 5:
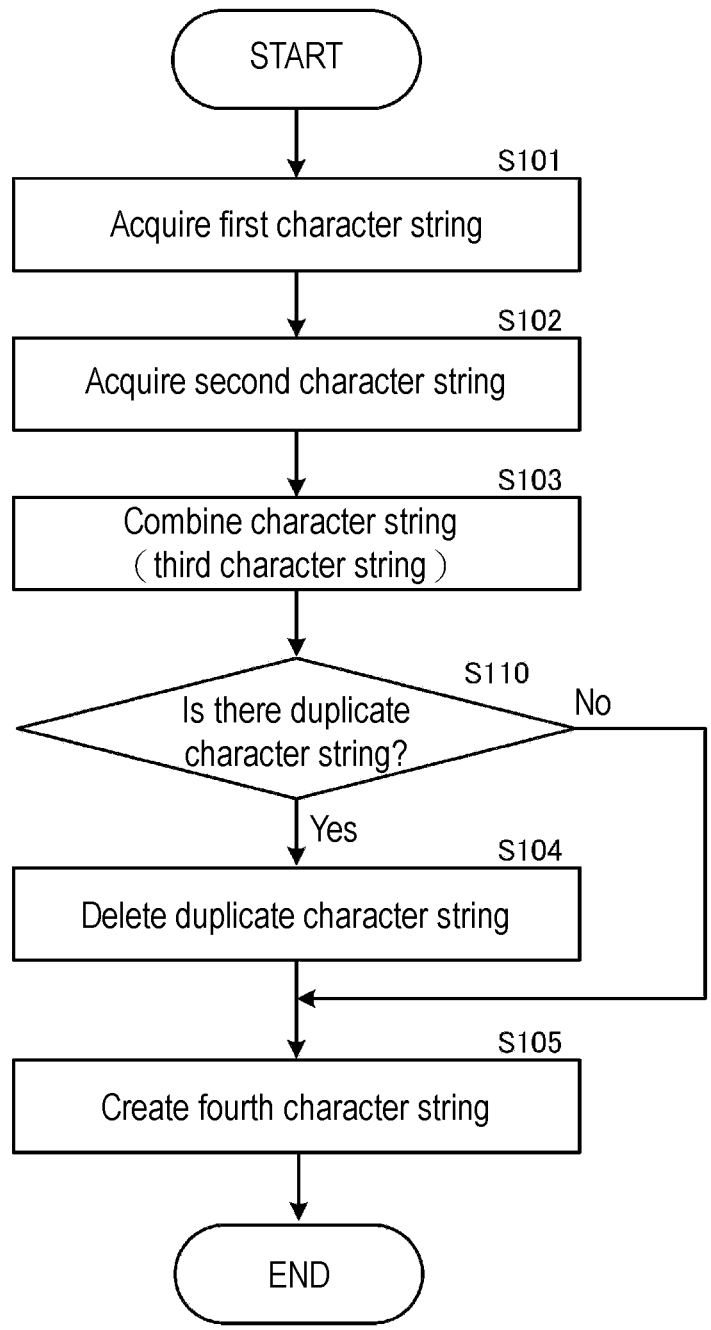
FIG. 5 is a flow chart illustrating the flow of processing of a character input device according to Modification Example 1.

FIG. 5 is a flow chart illustrating the flow of processing of the character input device according to Modification Example 1. After performing the process of step S103 in Configuration Example 1, the character string combination unit 42 determines whether or not there is a duplicate character string (S110).

When the character string combination unit 42 determines that there is a duplicate character string (S110: Yes), the character string combination unit 42 in step S104 performs processing for deleting the duplicate character string from the third character.

On the other hand, when determining that a duplicate character string does not exist (S110: No), the character string combination unit 42 creates a fourth character string without performing the process of step S104. That is, the fourth character string is the same character string as the third character string. That is, the fourth character string is a character string that has undergone only the process of combining the first character string and the second character string.

Even with such a configuration, the intended character string may be acquired even when the user performs character input by combining a plurality of input methods (the first input unit 21 and the second input unit 22).

That is, it is possible to easily acquire the character string intended by the user, and the user can efficiently input characters.

5. Configuration Example 2

Next, a character input device according to Configuration Example 2 will be described with reference to the drawings. Configuration Example 2 differs from Configuration Example 1 in that the control unit 40 of the character input device 10 includes a score calculation unit 43 and a priority determination unit 44. The rest of the configuration is the same as that of the character input device 10, and the description of the similar parts is omitted.

Figure 6:
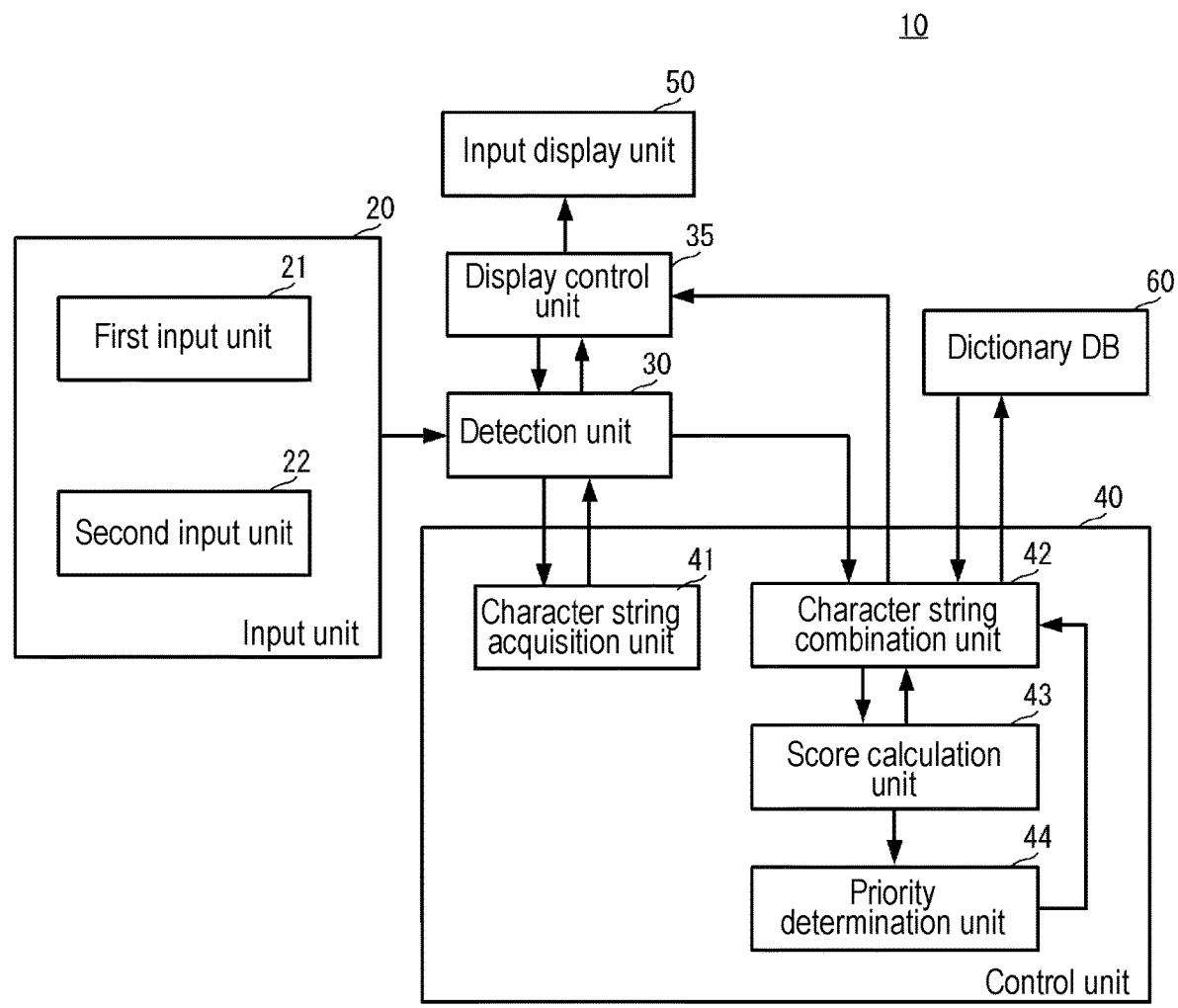
FIG. 6 is a block diagram illustrating the configuration of a character input device according to Configuration Example 2.
Figure 7:
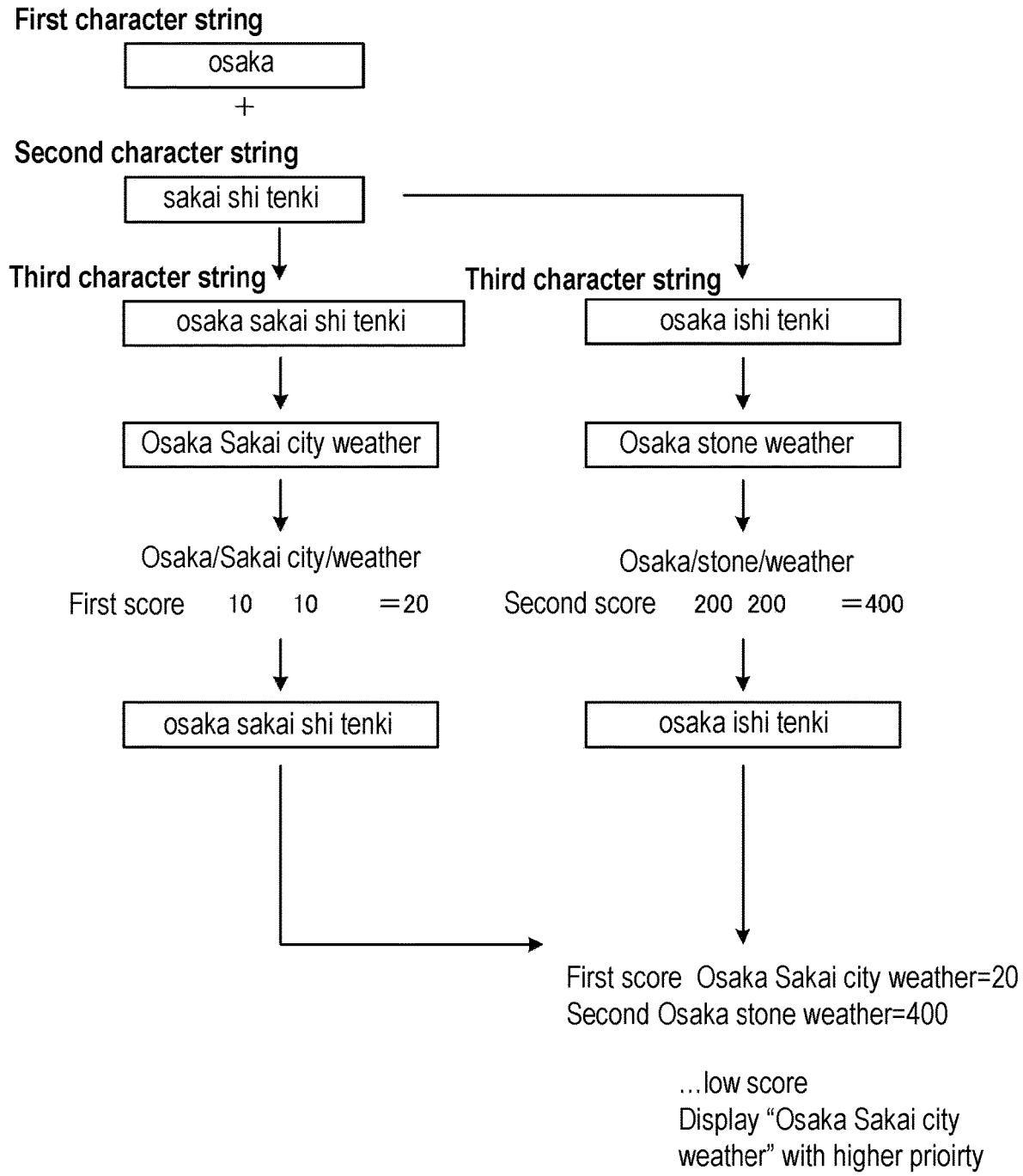
FIG. 7 is a diagram illustrating the flow of processing of the character input device according to Configuration Example 2.
Figure 8:
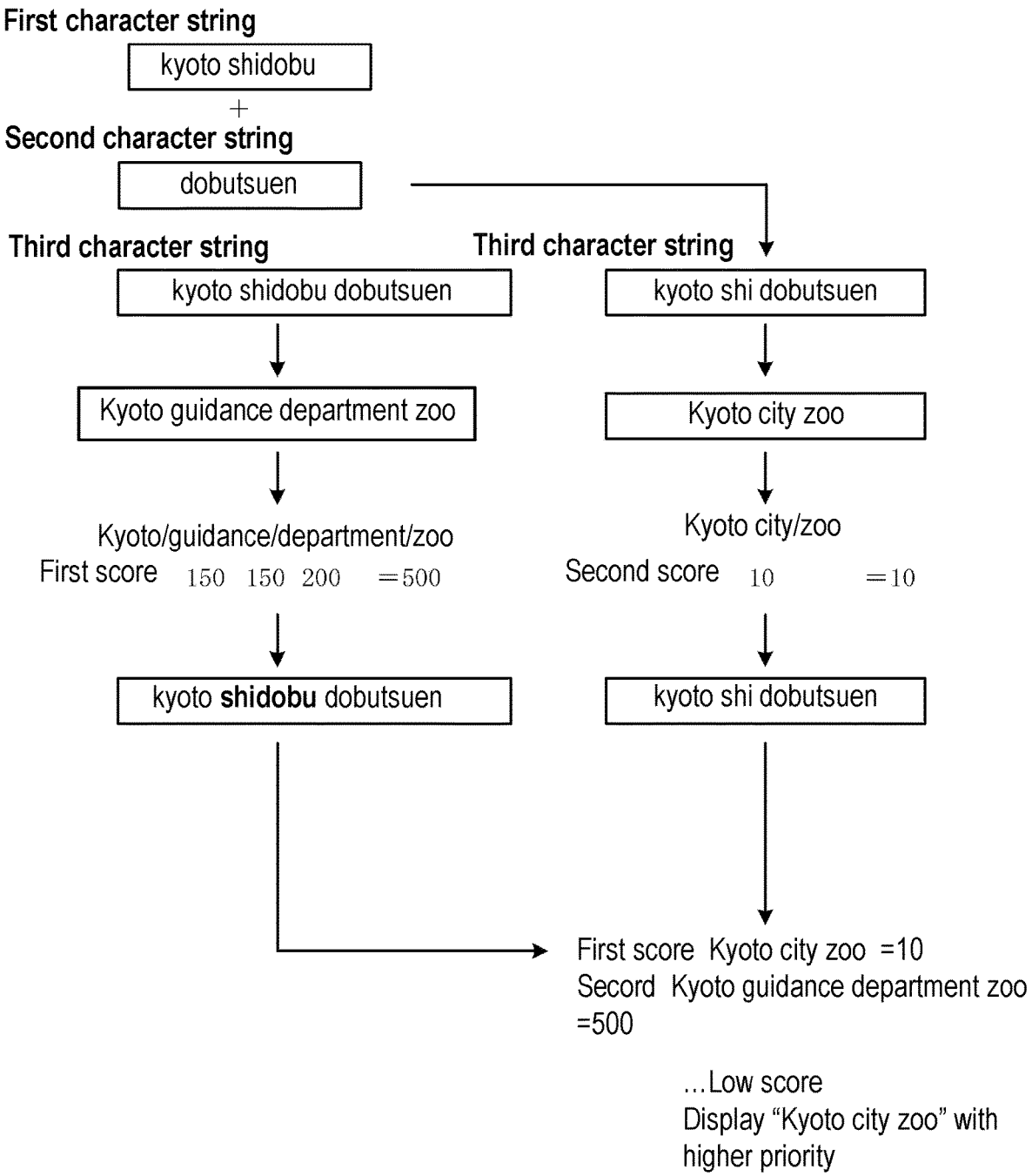
FIG. 8 is a diagram illustrating a flow of processing of the character input device according to Configuration Example 2.
Figure 9:
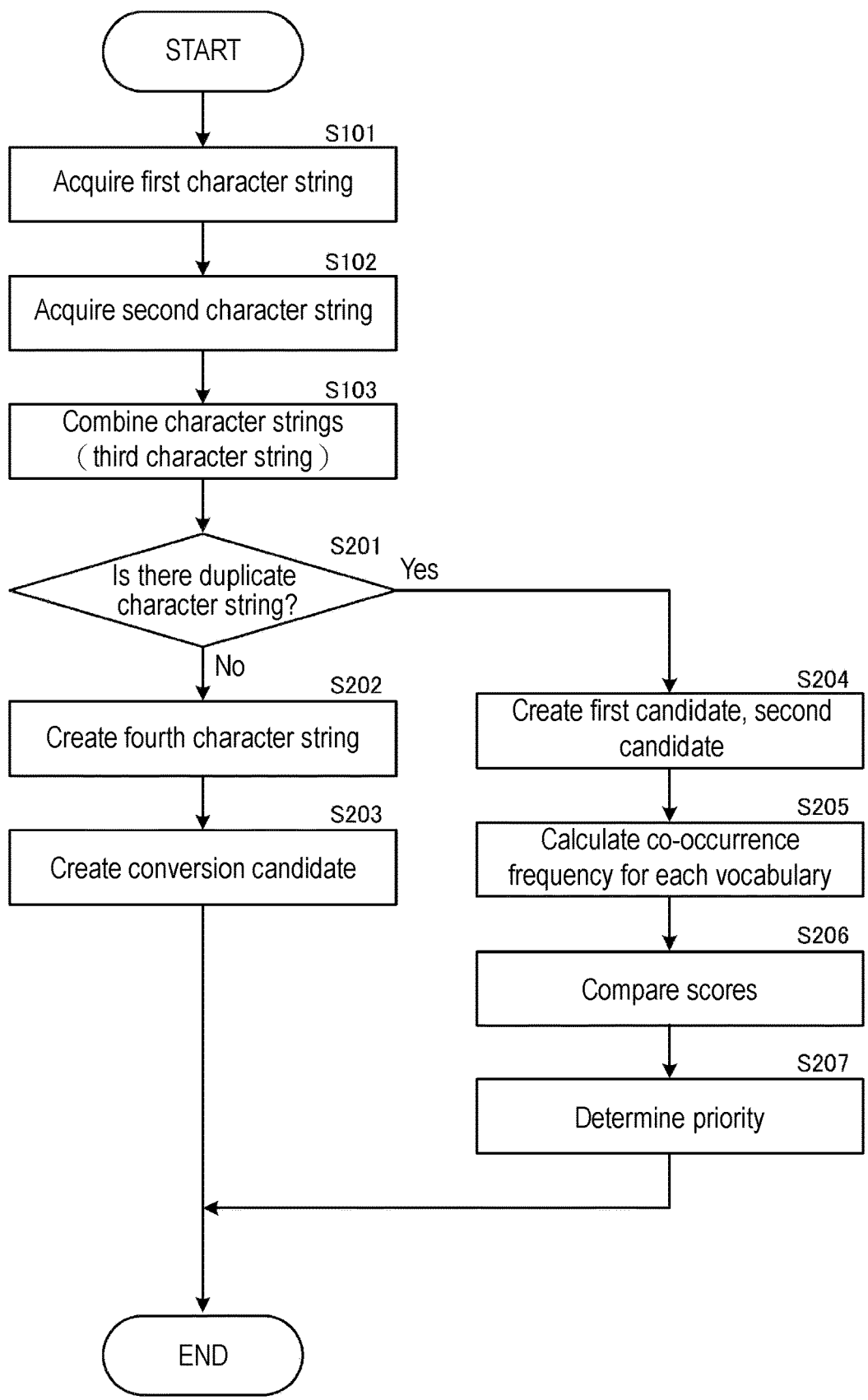
FIG. 9 is a flow chart illustrating the flow of processing of the character input device according to Configuration Example 2.

FIG. 6 is a block diagram illustrating the configuration of the character input device according to Configuration Example 2. FIG. 7 is a diagram illustrating the flow of processing of the character input device according to Configuration Example 2. FIG. 8 is a diagram illustrating a flow of processing of the character input device according to Configuration Example 2. FIG. 9 is a flow chart illustrating the flow of processing of the character input device according to Configuration Example 2.

The control unit 40 includes the character string acquisition unit 41, the character string combination unit 42, the score calculation unit 43, and the priority determination unit 44. The score calculation unit 43 quantifies the co-occurrence relation of the character strings separated into vocabularies. More specifically, when a vocabulary A and a vocabulary B are present, the score calculation unit 43 calculates the score for which the vocabulary A and the vocabulary B appear at the same time.

(Definition of Score Calculation)

Here, the method for calculating a score of the third character string by the score calculation unit 43 will be described. The character string combination unit 42 determines the duplicate character string based on the score calculated by the score calculation unit 43. That is, the score calculation unit 43 generates a score that serves as a reference for determining whether or not to delete the duplicate character string, and the character string combination unit 42 determines whether or not to delete the duplicate character string based on the score. The score is acquired from the sum of co-occurrence frequencies of neighboring vocabularies.

The co-occurrence frequency is calculated using co-occurrence information acquired from, for example, a Japanese co-occurrence dictionary. This co-occurrence frequency is compiled into a database into vocabularies (elements) and stored in the dictionary DB 60.

The co-occurrence frequency is assumed have a higher probability of simultaneous appearance when the number is smaller, and have a lower probability of simultaneous appearance when the number is larger. That is, when the co-occurrence frequency of the vocabulary A and the vocabulary B is "10" and the co-occurrence frequency of the vocabulary A and a vocabulary C is "100", the score calculation unit 43 determines that the probability that the vocabulary A and the vocabulary B appear at the same time is high.

(Score Calculation Method and Duplicate Character String Determination Method)

(1) The character string combination unit 42 acquires from the dictionary DB 60 a candidate (first candidate) in which the duplicate character string of the third character string is not deleted and a candidate (second candidate) in which the character string is deleted. The character string combination unit 42 outputs the respective conversion candidate to the score calculation unit 43.

(2) The score calculation unit 43 performs morphological analysis on each of the first candidate and the second candidate, and divides them into vocabularies.

(3) The score calculation unit 43 acquires the co-occurrence frequency for each of the neighboring vocabularies in the first candidate and the second candidate.

(4) The score calculation unit 43 calculates the sum (score) of the co-occurrence frequencies of the character strings as conversion candidates.

(5) The score calculation unit 43 outputs the score for each conversion candidate to the character string combination unit 42.

(6) The character string combination unit 42 selects the conversion candidate with the lowest score.

(7) The character string combination unit 42 deletes the duplicate character strings based on the score so as to create a fourth character string.

A more specific example of how the character string combination unit 42 creates the fourth character string will be described with reference to FIGS. 7 and 8.

FIG. 7 shows an example in which the first character string is "osaka" (Osaka) and the second character string is "sakai shi tenki" (Sakai city weather). At this time, the character string combination unit 42 creates third character strings "osaka sakai shi tenki" (Osaka Sakai city whether) and "osaka ishi tenki" (Osaka stone whether). At this time, the conversion candidate of "osaka sakai shi tenki" is set as the first candidate, and the conversion candidate of "osaka ishi tenki" is set as the second candidate.

The character string combination unit 42 outputs the first candidate "Osaka Sakai city weather" to the score calculation unit 43. The score calculation unit 43 performs morphological analysis on the first candidate "Osaka Sakai city weather". At this time, the score calculation unit 43 divides it into vocabularies such as "Osaka", "Sakai city", and "weather". The score calculation unit 43 sets the co-occurrence frequency of "Osaka"/"Sakai city" to "10" and the co-occurrence frequency of "Sakai city"/"weather" to "10". That is, the score calculation unit 43 calculates the score of the first candidate (first score) as "20".

Next, the character string combination unit 42 outputs the second candidate "Osaka stone weather" to the score calculation unit 43. The score calculation unit 43 performs morphological analysis on the second candidate "Osaka stone weather". At this time, the score calculation unit 43 divides it into vocabularies such as "Osaka", "stone", and "weather". The score calculation unit 43 sets the co-occurrence frequency of "Osaka"/"stone" to "200" and the co-occurrence frequency of "stone"/"weather" to "200". That is, the score calculation unit 43 calculates the score of the second candidate (second score) as "400".

The score calculation unit 43 compares the first score and the second score and determines that the first score is low. That is, the score calculation unit 43 determines that the first candidate "Osaka Sakai city weather" is the conversion candidate intended by the user. The score calculation unit 43 outputs the result to the priority determination unit 44. The priority determination unit 44 determines to raise priority of the first candidate "Osaka Sakai city weather" and outputs the result to the character string combination unit 42.

The character string combination unit 42 outputs the first candidate "Osaka Sakai city weather" to the display control unit 35. The display control unit 35 raises the priority of the first candidate "Osaka Sakai city weather" and causes the input display unit 50 to display it.

FIG. 8 illustrates an example in which the first character string is "kyoto shi dobu" (Kyoto city z) and the second character string is "dobutsuen" (zoo). At this time, the character string combination unit 42 creates "kyoto shidobu dobutsuen" (Kyoto city z zoo) and "kyoto shi dobutsuen" (Kyoto city zoo) as the third character strings. At this time, the conversion candidate of "kyoto shi dobu dobutsuen" is set as the first candidate, and the conversion candidate of "kyoto shi dobutsuen" is set as the second candidate.

The character string combination unit 42 outputs the first candidate "Kyoto guidance department zoo" to the score calculation unit 43. The score calculation unit 43 performs morphological analysis on the first candidate "Kyoto guidance department zoo". At this time, the score calculation unit 43 divides it into vocabularies such as "Kyoto", "guidance", "department", and "zoo". The score calculation unit 43 sets the co-occurrence frequency of "Kyoto"/"guidance" to "150", the co-occurrence frequency of "guidance"/"department" to "150", and the co-occurrence frequency of "department"/"zoo" to "200". That is, the score calculation unit 43 calculates the score of the first candidate (first score) as "500".

Next, the character string combination unit 42 outputs the second candidate "Kyoto city zoo" to the score calculation unit 43. The score calculation unit 43 performs morphological analysis on the second candidate "Kyoto city zoo". At this time, the score calculation unit 43 divides it into vocabularies such as "Kyoto city" and "zoo". The score calculation unit 43 sets the co-occurrence frequency of "Kyoto city"/"zoo" to "10". That is, the score calculation unit 43 calculates the score of the second candidate (second score) as "10".

The score calculation unit 43 compares the first score and the second score and determines that the second score is low. That is, the score calculation unit 43 determines that the second candidate "Kyoto city zoo" is the conversion candidate intended by the user. The score calculation unit 43 outputs the result to the priority determination unit 44. The priority determination unit 44 determines to raise the priority of the second candidate "Kyoto city zoo" and outputs the result to the character string combination unit 42.

The character string combination unit 42 outputs the second candidate "Kyoto city zoo" to the display control unit 35. The display control unit 35 preferentially displays the second candidate "Kyoto city zoo" on the input display unit 50.

Next, the flow of processing of the character input device 10 in Configuration Example 2 will be described with reference to FIG. 9. Note that steps S101 to S103 are the same as in Configuration Example 1, and therefore are omitted.

The character string combination unit 42 determines whether or not there is a duplicate character string (S201). When it is determined that there is no duplicate character string (S201: No), the character string combination unit 42 combines the first character string and the second character string as they are to create a fourth character string (S202). That is, the third character string is taken as the fourth character string.

The character string combination unit 42 acquires conversion candidates for the fourth character string from the dictionary DB 60 (S203).

On the other hand, when determining that there is a duplicate character string (S201: Yes), the character string combination unit 42 creates a first candidate and a second candidate (S204). The character string combination unit 42 outputs the first candidate and the second candidate to the score calculation unit 43.

The score calculation unit 43 performs morphological analysis on the first candidate and the second candidate, and divides the first candidate and the second candidate into vocabularies. Moreover, the score calculation unit 43 calculates the co-occurrence frequency for each vocabulary in the first candidate. Similarly, the score calculation unit 43 calculates the co-occurrence frequency for each vocabulary in the second candidate (S205).

The score calculation unit 43 calculates the sum of the co-occurrence frequencies of the first candidates (first score) and the sum of the co-occurrence frequencies of the second candidates (second score). Thereby, the score calculation unit 43 compares the first score and the second score (S206). The score calculation unit 43 outputs the result of comparing the first score and the second score to the priority determination unit 44.

The priority determination unit 44 determines the priority in the display of the first candidate and the second candidate based on the comparison result of the first score and the second score (S207). The score calculation unit 43 outputs the fourth character string and conversion candidates for the fourth character string to the character string combination unit 42.

With such a configuration, even when the user inputs characters by combining a plurality of input methods (the first input unit 21 and the second input unit 22), the intended character string may be acquired.

Further, in the above-described configuration, it is possible to determine whether or not to delete duplicate character strings according to relationship of vocabularies, without being limited to mechanically deleting duplicate character strings. That is, it is possible to easily acquire the character string intended by the user, and the user can input characters more efficiently.

6. Configuration Example 3

Next, a character input device according to Configuration Example 3 will be described with reference to the drawings.

Configuration Example 3 differs from Configuration Example 2 in that the score determination unit compares the score with a threshold value and performs a wildcard search based on the score. The rest of the configuration is the same as that of the character input device 10, and the description of the similar parts is omitted.

Figure 10:
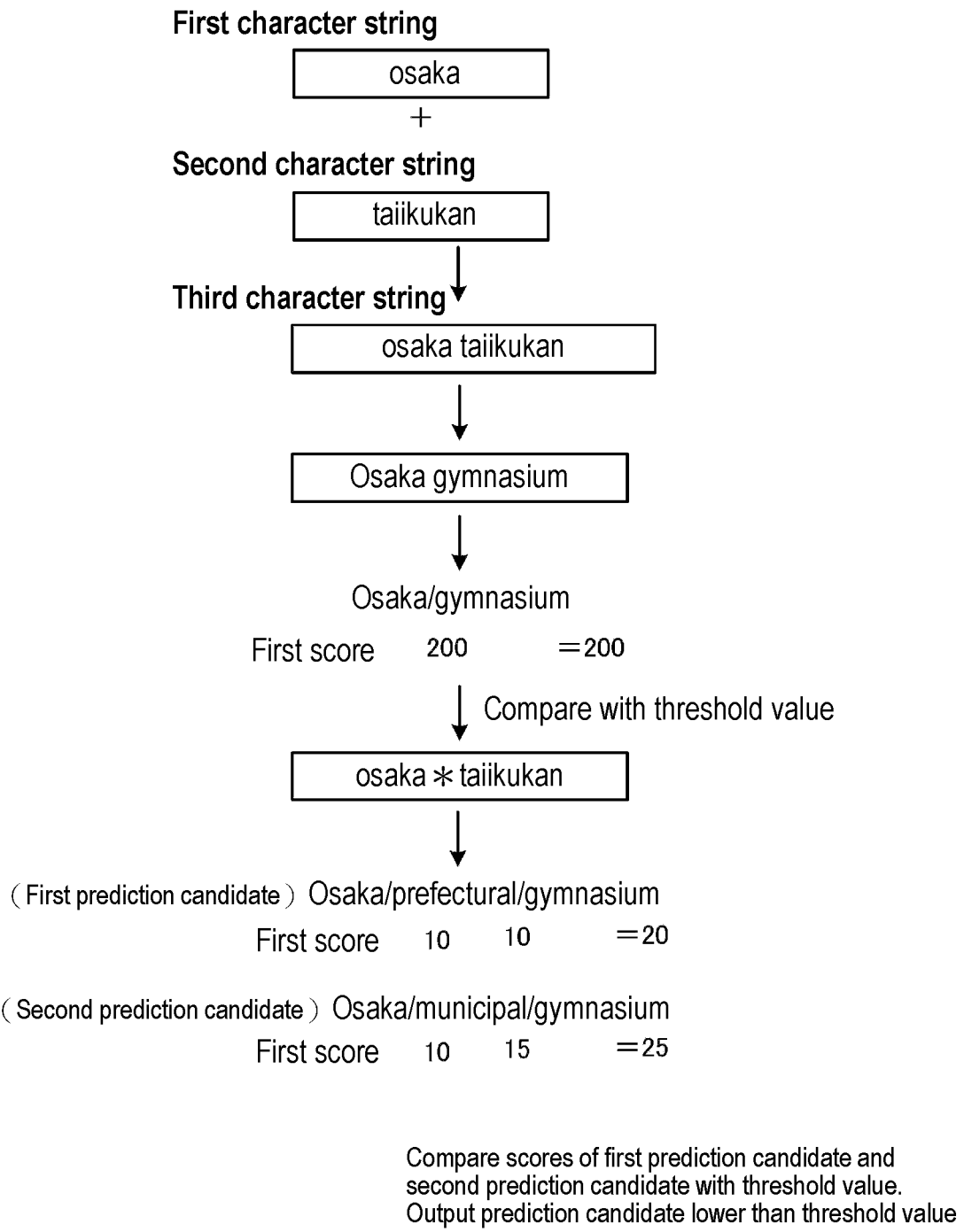
FIG. 10 is an image diagram of character input by a character input device according to Configuration Example 3.
Figure 11:
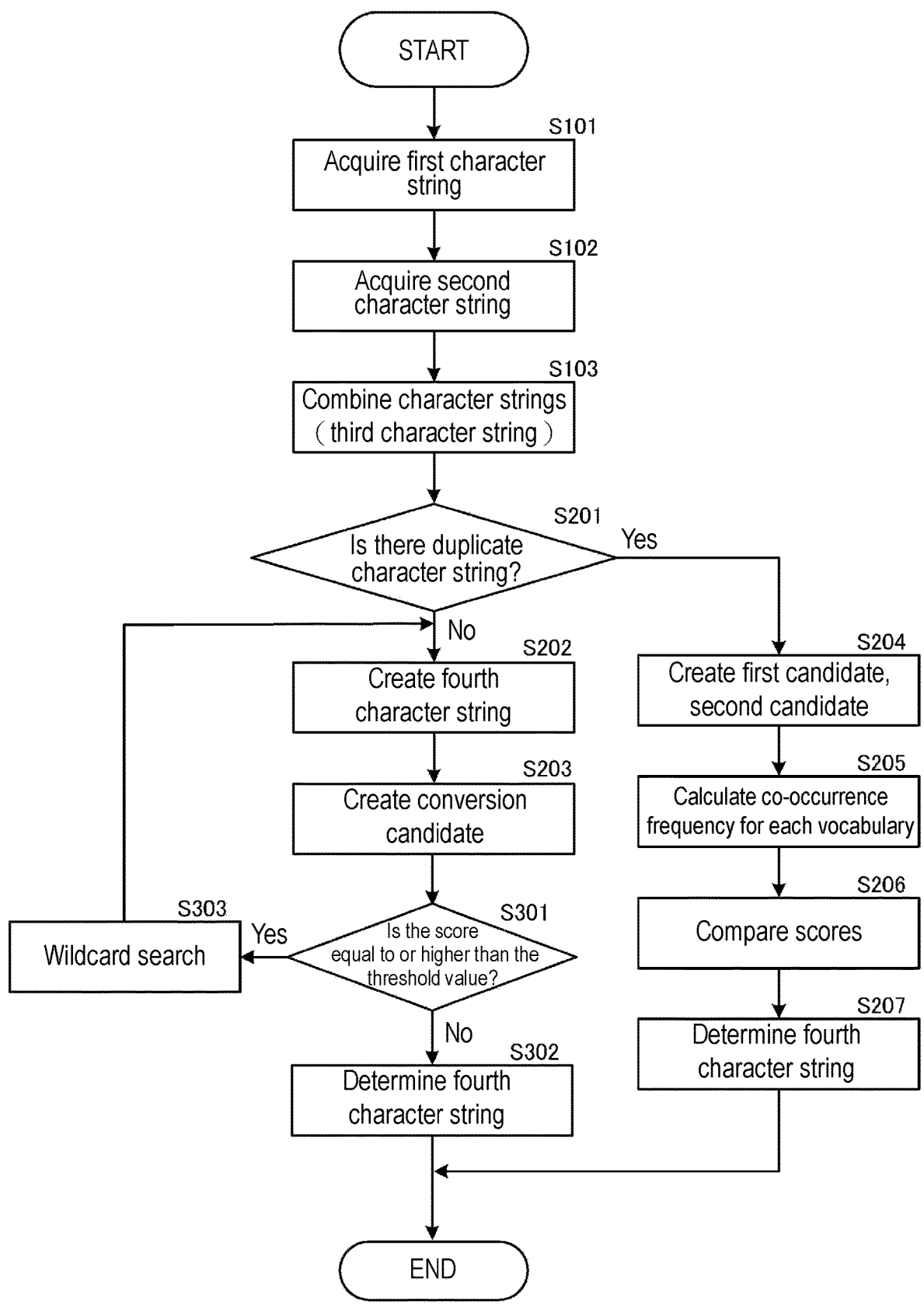
FIG. 11 is a flow chart illustrating a flow of processing of the character input device according to Configuration Example 3.

FIG. 10 is an image diagram of character input by the character input device 10 according to Configuration Example 3. FIG. 11 is a flow chart illustrating a flow of processing of the character input device 10 according to Configuration Example 3.

FIG. 10 illustrates an example in which the first character string is "osaka" (Osaka) and the second character string is "taiikukan" (gymnasium). At this time, the character string combination unit 42 creates "osaka taiikukan" (Osaka gymnasium) as the third character string. The character string combination unit 42 creates a conversion candidate "Osaka gymnasium" for the third character string "osaka taiikukan".

The character string combination unit 42 outputs the conversion candidate "Osaka gymnasium" to the score calculation unit 43. The score calculation unit 43 performs morphological analysis on the conversion candidate "Osaka gymnasium". At this time, the score calculation unit 43 divides it into vocabularies such as "Osaka" and "gymnasium". The score calculation unit 43 sets the co-occurrence frequency of "Osaka"/"gymnasium" to "200" (first score).

At this time, the score calculation unit 43 compares the first score with a preset threshold value. This threshold value may be an arbitrary value. Moreover, this threshold value is set to a low value if it is in a state that completely matches or substantially matches the data stored in the dictionary DB 60 or the like. On the other hand, if the user wishes to perform a flexible search, a high threshold value may be set.

For example, when the threshold value is 50, the first score of "Osaka"/"gymnasium" is "200", so the score calculation unit 43 determines that the conversion candidate is not the character string intended by the user. That is, it is determined that there is character string missing between the first character string "osaka" and the second character string "taiikukan". That is, the score calculation unit 43 determines that a joining character string is required between the first character string "osaka" and the second character string "taiikukan". The score calculation unit 43 outputs the result to the character string combination unit 42.

The character string combination unit 42 adds a joining character string "*" between the first character string "osaka" and the second character string "taiikukan". That is, the character string combination unit 42 adds the joining character string as a wildcard. The character string combination unit 42 sets the third character string to "osaka* (wildcard) taiikukan" and searches the dictionary DB 60 for conversion candidates. The character string combination unit 42 acquires the first prediction candidate "Osaka prefectural gymnasium" and the second prediction candidate "Osaka municipal gymnasium".

The character string combination unit 42 outputs the first prediction candidate "Osaka prefectural gymnasium" and the second prediction candidate "Osaka municipal gymnasium" to the score calculation unit 43. The score calculation unit 43 performs morphological analysis on the first prediction candidate "Osaka prefectural gymnasium" and the second prediction candidate "Osaka municipal gymnasium".

At this time, the score calculation unit 43 divides the first prediction candidate "Osaka prefectural gymnasium" into vocabularies such as "Osaka", "prefectural", and "gymnasium". The score calculation unit 43 sets the co-occurrence frequency of "Osaka"/"prefectural" to "10" and the co-occurrence frequency of "prefectural"/"gymnasium" to "10". That is, the score calculation unit 43 calculates the score of the first prediction candidate as "20".

Similarly, the score calculation unit 43 divides the second prediction candidate "Osaka municipal gymnasium" into vocabularies such as "Osaka", "municipal", and "gymnasium". The score calculation unit 43 sets the co-occurrence frequency of "Osaka"/"municipal" to "10" and the co-occurrence frequency of "municipal"/"gymnasium" to "15". That is, the score calculation unit 43 calculates the score of the second prediction candidate as "25".

The score calculation unit 43 compares the scores of the first prediction candidate and the second prediction candidate with a threshold value. As for the threshold value described above, the score calculation unit 43 compares the score of the first prediction candidate and the score of the second prediction candidate with the threshold value. The score calculation unit 43 determines that the first prediction candidate and the second prediction candidate are the character strings intended by the user, and outputs these prediction candidates to the character string combination unit 42.

The character string combination unit 42 outputs the first prediction candidate and the second prediction candidate to the display control unit 35. The display control unit 35 displays the first prediction candidate and the second prediction candidate on the input display unit 50. At this time, the display control unit 35 may preferentially display a prediction candidate with a smaller threshold value out of the first prediction candidate and the second prediction candidate.

Next, the flow of processing of the character input device 10 in Configuration Example 3 will be described with reference to FIG. 11. Note that steps S101 to S103, steps S201 and S206 are the same as those in Configuration Example 2, and therefore are omitted.

When it is determined that there is no duplicate character string (S201: No), the character string combination unit 42 combines the first character string and the second character string as they are to create a fourth character string (S202). The character string combination unit 42 acquires conversion candidates for the fourth character string from the dictionary DB 60 (S203).

The character string combination unit 42 outputs conversion candidates for the fourth character string to the score calculation unit 43. The score calculation unit 43 determines whether or not the score is equal to or higher than the threshold value (S301).

When it is determined that the score is equal to or higher than the threshold value (S301: Yes), the score calculation unit 43 determines that the conversion candidate is not the character string intended by the user. The score calculation unit 43 outputs the result to the character string combination unit 42.

The character string combination unit 42 adds a joining character string (wildcard) "*" between the first character string and the second character string, and searches for conversion candidates from the dictionary DB 60 (S303). After performing step S303, the character string combination unit 42 performs step S202 again.

On the other hand, when it is determined that the score is lower than the threshold value (S301: No), the score calculation unit 43 determines that the conversion candidate is the character string intended by the user. The score calculation unit 43 decides the fourth character string (S302). The score calculation unit 43 outputs the fourth character string and conversion candidates for the fourth character string to the character string combination unit 42.

With such a configuration, even when the user inputs characters by combining a plurality of input methods (the first input unit 21 and the second input unit 22), the intended character string may be acquired.

Further, in the above configuration, if it is determined that there is character string missing between the first character string and the second character string, a wildcard search may be performed. That is, it is possible to easily acquire the character string intended by the user, and the user can input characters more efficiently.

7. Modification Example 2

Next, a character input device according to Modification Example 2 will be described. Modification Example 4 differs from Configuration Example 1 in that the input mode according to Configuration Example 1 is the kana input mode, whereas Modification Example 2 is the alphabet input mode. The rest of the configuration is the same as that of the character input device 10, and the description of the similar parts is omitted.

Figure 12:
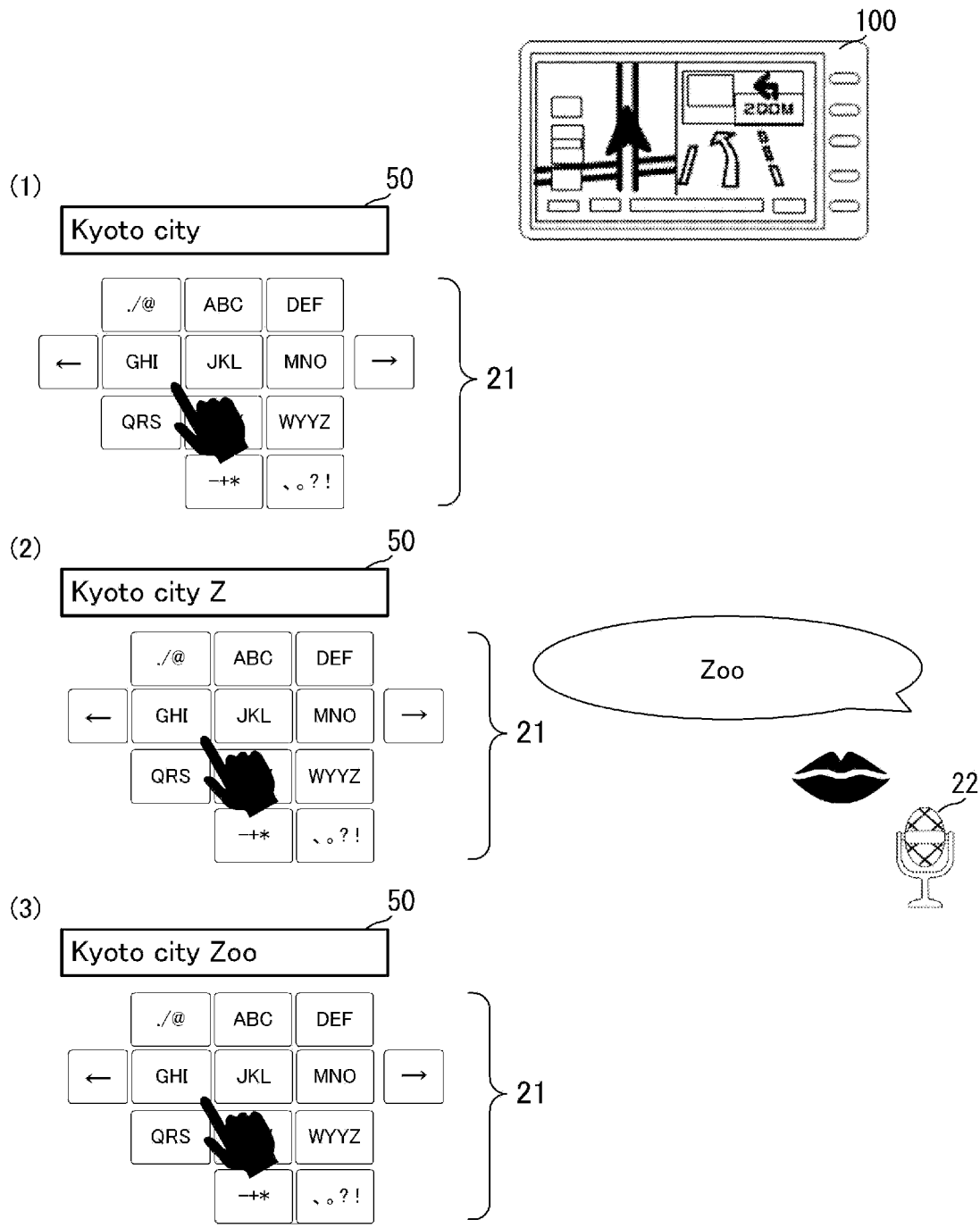
FIG. 12 is an image diagram of a character input by the character input device according to Modification Example 2.

As shown in FIG. 12, the character input device 10 according to Configuration Example 2 differs in that in Modification Example 2, the first input unit 21 is in the alphabet input mode and the second input unit 22 accepts English voice input, whereas in the character input device 10 according to Configuration Example 1, the first input unit 21 is in the kana input mode, and the second input unit 22 accepts Japanese input. The rest of the configuration of the character input device 10 is the same as that of the character input device 10, and the description of the same portions will be omitted. Although the first input unit 21 in FIG. 12 uses a 12-key keyboard (numeric keyboard), a keyboard with QWERTY layout may be configured.

An example in which the first input unit 21 and the second input unit 22 are in the alphabet input mode will be described below. However, the type of language to be input as a character string is not limited to the alphabet input mode, and may be another type of language. The type of language may be, for example, Chinese, which is a way that allows users to input the phonetic notation of a word to be input as a character string (intended character string), or German, which is a way that allows the user to input the spelling of the word to be input as a character string.

The first input unit 21 accepts the first character "Kyoto City Z". Next, the second input unit 22 accepts the second character "Zoo".

The character string combination unit 42 deletes the duplicate character string "Z" from the third character string "Kyoto City Z Zoo". As a result, the character string combination unit 42 creates a fourth character string "Kyoto City Zoo".

That is, even when the user inputs characters by combining a plurality of input methods (the first input unit 21 and the second input unit 22) using an input mode other than Japanese, it is possible to acquire the intended character string. Further, when a duplicate character string exists in the first character string and the second character string, it is possible to delete the duplicate character string by determining that the duplicate character string exists.

That is, it is possible to easily acquire the character string intended by the user, and the user can efficiently input characters.

In the above example, the first input unit 21 is for character input using the software keyboard, and the second input unit 22 is for voice input. However, the first input unit 21 may be voice input, and the second input unit 22 may be character input using a software keyboard.

Further, the first input unit 21 and the second input unit 22 are not limited to character input using a software keyboard or voice input. For example, the first input unit 21 and the second input unit 22 may be for input by handwriting, input by gesture, or the like.

It should be noted that the disclosure is not limited to the above examples, and may be embodied by modifying the constituent elements without departing from the scope of the disclosure at the implementation stage. Moreover, various disclosures may be formed by appropriate combinations of a plurality of constituent elements disclosed in the above examples. For example, some components may be deleted from all the components shown in the above example. Further, the constituent elements of different examples may be combined as appropriate.

Further, the correspondence relationship between the configuration according to the disclosure and the configuration described above may be described as the following appendix.

APPENDIX

A character input device (10) converts an input character string into a corresponding conversion character string. The character input device (10) includes a first input unit (21), a second input unit (22), and a character string combination unit (42). The first input unit (21) accepts input of a first character string by a first input method. The second input unit (22) accepts input of a second character string by a second input method different from the first input method. when the input of second character string is accepted after the input of the first character string is accepted, the character string combination unit (42) generates an input character string candidate by connecting the first character string and the second character string accepted for input this time. Further, the character string combination unit extracts an identical character string as a duplicate character strings at a tail of the first character string and a head of the second character string; and when the duplicates character string is extracted, generates a character string as one of the input character string candidates formed by connecting the first character string without the duplicate character string and the second character string without the duplicate character string by the duplicate character string.

What is claimed is:

1. A character input device, converting an input character string into a corresponding conversion character string, the character input device comprising:
   a first input device that accepts input of a first character string by a first input method;
   a second input device that accepts input of a second character string by a second input method different from the first input method; and
   a hardware processor that, when the input of the second character string is accepted after the input of the first character string is accepted, generates an input character string candidate by connecting the first character string and the second character string accepted for input this time,
   wherein the hardware processor:
      determines whether or not a character string at a tail of the first character string is identical to a character string at a head of the second character string; and
      in response to the character string at the tail of the first character string being identical to the character string at the head of the second character string, extracts the character string as a duplicate character string, and generates a character string as one of the input character string candidates formed by sequentially connecting the first character string without the duplicate character string, the duplicate character string, and the second character string without the duplicate character string.

2. The character input device according to claim 1,
wherein the hardware processor generates a character string as one of the input character string candidates formed by connecting to the second character string immediately after the first character string,
wherein the hardware processor is configured to:
divide the conversion character string of the input character string into vocabularies for each input character string candidate and calculate a co-occurrence frequency between the vocabularies; and
determine priority of the conversion character strings according to the co-occurrence frequency.

3. The character input device according to claim 2,
wherein the hardware processor is configured to predict a joining character string that connects the first character string and the second character string, and generate a character string as one of the input character string candidates formed by connecting the first character string and the second character string with the joining character string.

4. The character input device according to claim 2, wherein one of the first input method and the second input method is a key input method, and the other is a voice input method.

5. The character input device according to claim 3, wherein one of the first input method and the second input method is a key input method, and the other is a voice input method.

6. The character input device according to claim 1,
wherein the hardware processor is configured to predict a joining character string that connects the first character string and the second character string, and generate a character string as one of the input character string candidates formed by connecting the first character string and the second character string with the joining character string,
wherein the hardware processor is configured to:
divide the conversion character string of the input character string into vocabularies for each input character string candidate and calculate a co-occurrence frequency between the vocabularies; and
determine priority of the conversion character strings according to the co-occurrence frequency.

7. The character input device according to claim 6, wherein one of the first input method and the second input method is a key input method, and the other is a voice input method.

8. The character input device according to claim 1, wherein one of the first input method and the second input method is a key input method, and the other is a voice input method.

9. A character input method, wherein a computer of a character input device that converts an input character string into a corresponding conversion character string performs:
accepting input of a first character string by a first input method;
accepting input of a second character string by a second input method different from the first input method; and
generating, when the input of the second character string is accepted after the input of the first character string is accepted, an input character string candidate by connecting the first character string and the second character string accepted for input this time,
wherein the computer:
determines whether or not a character string at a tail of the first character string is identical to a character string at a head of the second character string; and
in response to the identical character string being existed character string at the tail of the first character string being identical to the character string at the head of the second character string, extracts the character string as a duplicate character string, and generates a character string as one of the input character string candidates formed by sequentially connecting the first character string without the duplicate character string, the duplicate character string, and the second character string without the duplicate character string by the duplicate character string.

10. A non-transitory character input computer-readable recording medium, causing a computer of a character input device that converts an input character string into a corresponding conversion character string to perform:
accepting input of a first character string by a first input method;
accepting input of a second character string by a second input method different from the first input method; and
generating, when the input of the second character string is accepted after the first character string is accepted, an input character string candidate formed by connecting the first character string and the second character string accepted for input this time,
wherein the computer:
determines whether or not a character string at a tail of the first character string is identical to a character string at a head of the second character string; and
in response to the character string at the tail of the first character string being identical to the character string at the head of the second character string, extracts the character string as a duplicate character string, and generates a character string as one of the input character string candidates formed by sequentially connecting the first character string without the duplicate character string, the duplicate character string, and the second character string without the duplicate character string by the duplicate character string.

* * * * *